OR 2,743,648

SEARCHROOM

May 1, 1956 D. J. PARKER 2,743,648

OPTICAL SYSTEM FOR IMAGE PROJECTION DEVICES

Filed Oct. 31, 1952

Torig. 2034

X back

INVENTOR.
Donald J. Parker
BY Morris L. Rabkin
ATTORNEY.

2,743,648
Patented May 1, 1956

2,743,648

OPTICAL SYSTEM FOR IMAGE PROJECTION DEVICES

Donald J. Parker, West Collingswood, N. J., assignor to Radio Corporation of America, a corporation of Delaware Application October 31, 1952, Serial No. 317,868

1 Claim. (Cl. 88—24)

Figure 1:
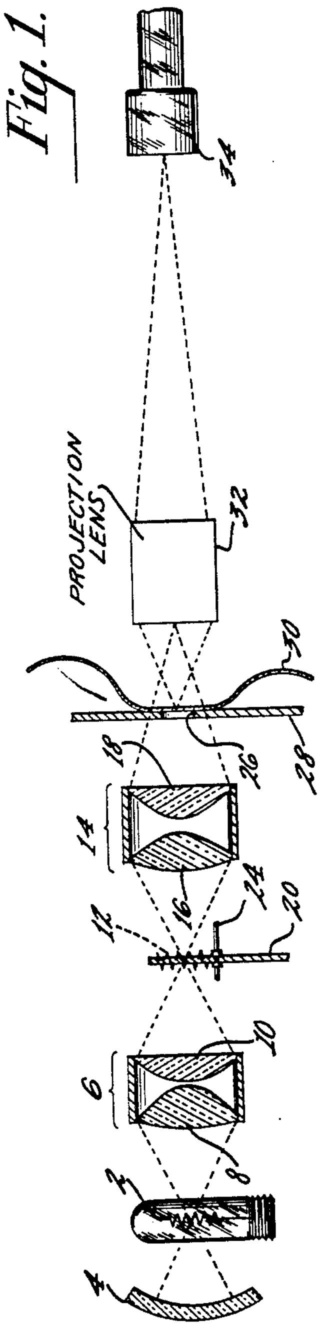

This invention relates to optical systems, and more particularly to apparatus suitable for the projection of film images onto a television pick-up tube.

In television broadcasting, many of the programs are film recordings. The films are run through a projector substantially similar to a conventional motion picture projector which projects the film image onto a television pick-up tube. In one system of transmitting film recorded programs, a film image is projected onto the target of a television pick-up tube during the vertical retrace phase of the tube scanning cycle, a time when the target of the tube is not being scanned. Such an arrangement is shown in U. S. Patent 2,166,214 issued to R. D. Kell. It has been noted that when a shutter moves to interrupt the light beam in a more or less conventional manner, a shadow of the shutter moves across the target of the pick-up tube, causing an objectionable defect in the quality of the picture image whenever the scanning beam of the pick-up tube crosses the edge of the shadow of the shutter. This condition, of course, can take place only if the shadow is crossing the target area during scan time of the tube. That defect is, in turn, detected by the scanning beam of the tube and is transmitted as a part of the picture.

It is, accordingly, one object of the present invention to provide an improved optical system for the projection of film images onto a television picture tube wherein the light interrupting means does not cause a shadow to fall upon the target of the pick-up tube.

It is another object of this invention to provide an improved optical system as set forth wherein the light interrupting means produces a diminution of the luminosity of the light beam falling upon the pick-up tube without decreasing the area of the light beam falling on the pick-up tube.

Among the conditions imposed upon the projection system by the requirement of the television system is that the image be projected onto the target of the pick-up tube within the period of the vertical blanking or retrace time. That time period is of extremely short duration. In order to obtain an appreciable signal to noise ratio in the image detected by the pick-up tube, maximum use must be made of the available time to adequately illuminate the target of the pick-up tube. It is further desirable that the film picture appearing at the film gate or aperture be uniformly illuminated so that one portion of the picture will not be more brightly illuminated than another portion.

It is, therefore, a further object of the present invention to provide an optical system as set forth which is characterized in a sharp transition of the illumination of the film appearing in the film gate.

It is a still further object of the present invention to provide an optical system as set forth which is characterized by the ability to produce a uniform illumination of the film gate.

In accomplishing these and other objects, there has been provided, in accordance with the present invention, an optical system which includes a two-stage relay condenser lens system of special design. Each stage comprises two air-spaced condenser lenses. An intermediate image of the light source is formed in a plane between the two stages of the condenser system. A light interrupting shutter is positioned to interrupt the light beam at its narrowest part, that is, in the plane of the intermediate image of the light source.

Figure 3:
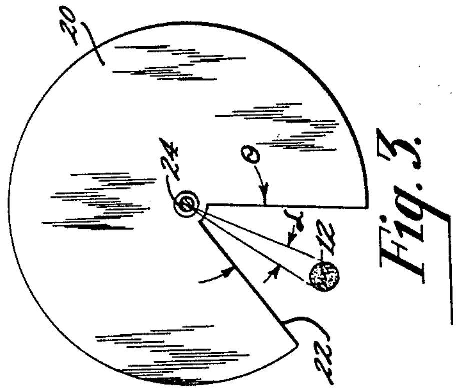
Figure 2:
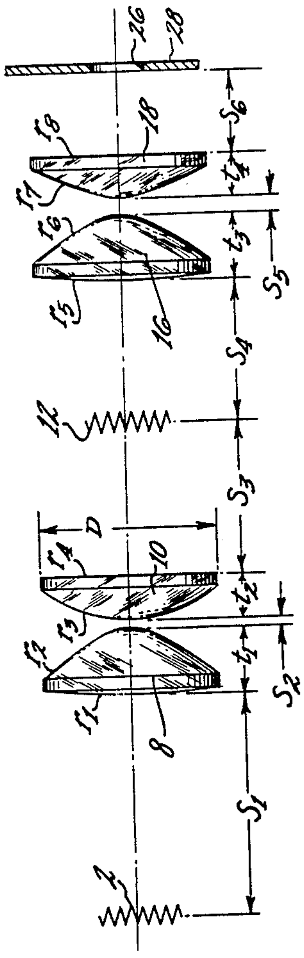

A better understanding of the present invention may be had from the following detailed description when read in connection with the accompanying drawing in which, Fig. 1 is a schematic representation of an optical system embodying the present invention, Fig. 2 is a view, on a somewhat enlarged scale, of the relay condenser lens system of the apparatus shown in Fig. 1 and, Fig. 3 is an elevational view of a shutter disc, suitable for use in the apparatus shown in Fig. 1, and illustrating the relationship of the shutter opening to the light beam.

Referring now to the drawing in more detail, there is shown in Fig. 1 an optical system which includes a light source 2 and a spherical reflector 4. The light source 2 is positioned at the center of curvature of the reflector 4. Light from the light source 2 passes through a two-stage relay condenser lens system. The first stage 6 of the lens system comprises a first lens 8 and a second lens 10. The first stage 6 produces a real image 12 of the light source 2. This real image 12 lies in a plane which is between the first stage 6 and the second stage 14 of the relay condenser lens system. The second stage 14 includes a third lens 16 and a fourth lens 18.

Positioned to operate in the plane established by the real image 12 of the light source 2 is a light interrupting shutter 20. The shutter 20 may be of the disc type as shown in Fig. 3. The disc is provided with a light admitting opening 22, and is secured for rotation about a central shaft 24. The light admitted by the shutter 20 and passing through the second stage 14, falls upon and illuminates an aperture or window 26 in a film gate 28.

During illumination periods a film 30 is held stationary against the film gate 28 with a film frame or picture in registration with the window 26. The light beam, modified by the image recorded on the film 30, falls upon a projection lens 32 which projects a light image of the film image onto the target of a television pick-up tube 34.

The rotation of the shutter 20 is synchronized, by means well known and not here shown, with the vertical deflection of the scanning beam of the television pick-up tube 34. Thus, the shutter completes one revolution during each field scanned by the scanning beam of the pick-up tube. If the field frequency of the television system is sixty fields per second, then the shutter rotates at sixty revolutions per second. While the total time for each revolution of the shutter is one-sixtieth of a second, during the major portion of that period the target of the pick-up tube is being scanned by the scanning beam. During the scanning portion of the cycle, no light from the optical system should fall on the target. Therefore, the image to be detected by the pick-up tube should be flashed onto the target during the vertical retrace or blanking time of the pick-up tube which is on the order of 1.33 milliseconds. The duration ($t$) of the light pulse from the film projector is $$t=\frac{\theta+\alpha}{\omega}$$

where $\theta$ is the angle subtended by the opening 22 in the shutter 20, $\alpha$ is the angle subtended by the light beam aperture in the shutter plane at the axis of rotation of the shutter $\omega$ is the angular velocity of the shutter (see Fig. 3). Although the real image 12 of the light source 2 is somewhat larger than that under consideration, the effective dimension of the light beam to which the equation relates is that determined by the aperture in a light stop in the projection lens 32 referred back to the shutter plane.

As previously pointed out, if the shutter operates to interrupt the light beam in such a way that a shadow of the edge of the shutter opening passes across the target of the pick-up tube during scan time, a defect in the quality of the detected image results. In the system thus far described, no shadow of the edge of the shutter opening is formed. The first stage 6 of the relay condenser lens system produces a real image 12 of the light source 2 in a plane laying between the first and second stages. It is in this plane that the shutter operates. As the edge of the shutter opening intercepts the image of the light source, the quantity of light reaching the film gate, and, hence, the pick-up tube, is reduced, but no shadow is developed. Since the shutter operates in the plane of the real image, the movement of the shuter into the field occupied by the image operates to reduce the total light passing the shutter. No shadow is formed because the real image has the attributes of being, itself, a source of light. Therefore, the effect is that the area of the light emitting image is progressively reduced until it is totally obliterated by the passing of the shutter into the plane of the image. The effect at the film gate aperture, and therefore at the target of the pick-up tube, is that the intensity of the light is progressively diminished until it is totally extinguished. However, the reduction in the intensity is uniform over the entire area of the film gate aperture.

In order to obtain a maximum amount of light on the film gate aperture during the short time available in each cycle, the increase and decrease in intensity should be as rapid as possible. The maximum rapidity for any given angular velocity of the shutter, may be realized by interrupting the light beam in the plane of its smallest cross-section area. In a light condensing optical system, the plane of the least cross-sectional area of the light beam is the plane in which an image of the light source is formed. Thus, the shutter 20 of the instant apparatus interrupts the light beam in the plane of the image of the light source, the plane of the least cross-sectional area of the light beam. This arrangement produces a very sharp transition between no illumination and full illumination of the film gate aperture 26.

The system thus far described exhibits an additional advantage in that the shutter 20 operates in a plane somewhat removed from the path of movement of the film. Thus the likelihood that the film will be contaminated by foreign matter flying from the rapidly rotating shutter is substantially reduced. Also the shutter mechanism is remote from the film moving mechanism.

A further characteristic desired in such an optical system is that the illumination of the film gate aperture be uniform over the area of the aperture. To this end, the condenser lens system of the present apparatus is especially designed. In accomplishing the desired illumination of the film gate aperture 26, the several lenses comprising the condenser system were characterized as follows: the first lens 8 is double-convex lens of which the first surface $r_1$ is spherical and the second surface $r_2$ is paraboloidal, the second lens 10 is slightly spaced from the first lens 8 and is plano-convex, the first surface $r_3$ being spherical and the second surface $r_4$ is planar, the third lens 16 is spaced a substantial distance from the second lens 10 and is identical to the first lens 8, and the fourth lens 18 is slightly spaced from the third lens 16 and is plano-convex with its first surface $r_7$ being paraboloidal and its second surface $r_8$ being planar.

In one working model constructed in accordance with the present invention and designed for use with a film gate aperture the dimensions of which were 0.380" by 0.284", the optical system had the following numerical data in which $r_1$, $r_2$ . . . represents the radii of curvature or the generating curve, as the case may be, of the several lenses; $t_1$, $t_2$ . . . represents the axial thicknesses of the lenses; $s_1$, is the axial air spacing of the plane of the light source 2 and the vertex of the first lens 8; $s_2$ is the axial air spacing between the first and second lenses 8 and 10; $s_3$ is the axial spacing between the second surface of the second lens 10 and the plane of the real image 12 of the light source 2; $s_4$ is the axial spacing between the plane of the real image 12 and the vertex of the third lens 16; $s_5$ is the axial spacing between the vertices of the third and fourth lenses 16 and 18; and $s_6$ is the axial spacing betwen the fourth lens 18 and the film gate 28. The first three lenses are made of a heat resisting optical glass while the fourth lens is made of spectacle crown glass. The table also shows the mean refractive index for the D-line of sodium light. The diameter D of the several lenses is 1.34". In the table, it is indicated that the three paraboloidal lenses have a vertex radius of curvature implied by the equations of the generating plane curves of the paraboloids. Variables $x$ and $y$ have the usual significance assigned in texts on analytical geometry where the origin of coordinates is at the vertex of the paraboloidal surface.

| Curvature | Thickness or air separation | Refractive index $n_D$ |
|---|---|---|
| | $s_1=1.65''$ | |
| $r_1=8.23''$ | | |
| | $t_1=0.472''$ | 1.478 |
| $r_2$ at vertex of $x=y^2/1.328=664''$ | | |
| | $s_2=0.035''$ | |
| $r_3=1.08''$ | | |
| | $t_2=0.313''$ | 1.478 |
| $r_4=\infty$ | | |
| | $s_3=1.15''$<br>$s_4=1.05''$ | |
| $r_5=8.23''$ | | |
| | $t_3=0.472''$ | 1.478 |
| $r_6$ at vertex of $x=y^2/1.328=664''$ | | |
| | $s_5=0.168''$ | |
| $r_7$ at vertex of $x=y^2/1.328=1''$ | | |
| | $t_4=0.300''$ | 1.523 |
| $r_8=\infty$ | | |
| | $s_6=0.67''$ | |

A condenser system constructed in accordance with these numerical values produces an illumination of the film gate which is substantially uniform over the full area of the film gate aperture. This, of course, results in a uniform illumination of the film, an image of which is to be projected, by the projection lens 32 onto the target of the television pick-up tube 34.

It may now be seen that there has been provided an improved optical system suitable for use with apparatus for projection film images onto a television pick-up tube wherein no shadow of the light interrupting means falls upon the film gate aperture, the transition from no-light to full illumination is accomplished in a minimum of time, and the film gate aperture is uniformly illuminated.

What is claimed is:

An optical system having numerical data substantially as set forth in the following table:

| Curvature | Thickness or air separation | Refractive Index $n_D$ |
|---|---|---|
| | $s_1$=1.65″ | |
| $r_1$=8.23″ | | |
| | $t_1$=0.472″ | 1.478 |
| $r_2$=vertex radius of curvature of the surface defined by the curve $x=y^2/1.328$ | | |
| | $s_2$=0.035″ | |
| $r_3$=1.08″ | | |
| | $t_2$=0.313″ | 1.478 |
| $r_4=\infty$ | | |
| | $s_3$=1.15″ | |
| | $s_4$=1.05″ | |
| $r_5$=8.23″ | | |
| | $t_3$=0.472″ | 1.478 |
| $r_6$=vertex radius of curvature of the surface defined by the curve $x=y^2/1.328$ | | |
| | $s_5$=0.168″ | |
| $r_7$=vertex radius of curvature of the surface defined by the curve $x=y^2/2$ | | |
| | $t_4$=0.300 | 1.523 |
| $r_8=\infty$ | | |
| | $s_6$=0.67 | |

where $r_1$, $r_2$ . . . represent the radii or the vertex radius of the generating curve of the surface of the lenses, $t_1$, $t_2$ . . . represent the thickness of the lenses along the optical axis, $s_1$, $s_2$ represents the air separation of the several features of the system, and $x$ and $y$ are the parameters of a system of Cartesian coordinates whose $x$ axis coincides with the optical axis of the system and whose origin is at the vertex of the generating curve.

References Cited in the file of this patent

UNITED STATES PATENTS

| | | |
|---|---|---|
| 1,615,674 | Beechlyn | Jan. 25, 1927 |
| 1,630,616 | Hill | May 31, 1927 |
| 1,709,017 | Hill | Apr. 16, 1929 |
| 2,140,979 | Bertele | Dec. 20, 1938 |
| 2,190,294 | Mili | Feb. 13, 1940 |
| 2,262,534 | Hoch | Nov. 11, 1941 |
| 2,474,297 | Young | June 28, 1949 |
| 2,609,724 | Isom | Sept. 9, 1952 |
| 2,612,554 | Anderson | Sept. 30, 1952 |
| 2,637,242 | Osterberg et al. | May 5, 1953 |